United States Patent [19]
Edwards

[11] Patent Number: 5,895,075
[45] Date of Patent: Apr. 20, 1999

[54] SECURITY LABEL

[75] Inventor: David Brian Edwards, Stevenage, United Kingdom

[73] Assignee: Aquasol Limited, United Kingdom

[21] Appl. No.: 08/714,068

[22] PCT Filed: Apr. 24, 1995

[86] PCT No.: PCT/GB95/00920

§ 371 Date: Sep. 11, 1996

§ 102(e) Date: Sep. 11, 1996

[87] PCT Pub. No.: WO95/29475

PCT Pub. Date: Nov. 2, 1995

[30] Foreign Application Priority Data

Apr. 22, 1994 [GB] United Kingdom ............... 9407989
Jul. 22, 1994 [GB] United Kingdom ............... 9414777

[51] Int. Cl.⁶ ............................................... B42D 15/00
[52] U.S. Cl. .................................. 283/81; 283/72; 283/83; 283/100; 283/101; 283/103; 428/915; 428/916
[58] Field of Search ........................ 283/81, 72, 82, 283/83, 100, 101, 103; 206/831; 229/87.05; 383/205, 206; 428/40.1, 40.9, 42.1, 42.2, 915, 916

[56] References Cited

U.S. PATENT DOCUMENTS

| | | |
|---|---|---|
| 3,265,286 | 8/1966 | Inoue ............................ 229/87.05 X |
| 3,631,617 | 1/1972 | Pekko . |
| 4,184,701 | 1/1980 | Franklin et al. . |
| 4,721,638 | 1/1988 | Matsuguchi et al. ............ 283/81 X |
| 4,746,052 | 5/1988 | Schmissrauter . |
| 4,746,556 | 5/1988 | Matsuguchi et al. ............ 283/81 X |
| 4,763,931 | 8/1988 | Matsuguchi et al. ............ 283/81 X |
| 4,826,213 | 5/1989 | Matsuguchi et al. ............ 283/81 X |
| 4,836,378 | 6/1989 | Lephardt ........................ 283/81 X |
| 4,837,061 | 6/1989 | Smits et al. .................... 283/81 X |
| 4,947,994 | 8/1990 | Newsome ................... 229/87.05 X |
| 5,084,143 | 1/1992 | Smith ............................. 283/81 X |
| 5,148,970 | 9/1992 | Johnston . |
| 5,153,042 | 10/1992 | Indrelie ........................ 283/81 X |
| 5,203,591 | 4/1993 | Treat ................................... 283/81 |
| 5,265,794 | 11/1993 | Johnston . |
| 5,409,115 | 4/1995 | Barkhorn ................... 229/87.05 X |
| 5,411,295 | 5/1995 | Bates et al. .......................... 283/81 |
| 5,484,167 | 1/1996 | Donaldson et al. ............ 283/81 X |
| 5,484,996 | 1/1996 | Wood ............................. 283/81 X |
| 5,582,434 | 12/1996 | Skov et al. ........................... 283/81 |
| 5,588,239 | 12/1996 | Anderson ...................... 283/81 X |
| 5,588,679 | 12/1996 | Skov et al. ..................... 283/81 X |
| 5,683,774 | 11/1997 | Faykish et al. ................. 283/81 X |

FOREIGN PATENT DOCUMENTS

| | | |
|---|---|---|
| 0 257 835 | 3/1988 | European Pat. Off. . |
| 26 13 131 | 10/1977 | Germany . |
| 2 167 008 | 5/1986 | United Kingdom . |

Primary Examiner—Frances Han
Attorney, Agent, or Firm—Harness, Dickey & Pierce, P.L.C.

[57] ABSTRACT

A security label has a bar code on the outer surface of an outer layer which is permanently bonded to an inner layer. A pull tab defined in the material of the outer and second layers is joined to a detachable portion extending across the length of the label whereby removal of the pull tab will tear out the detachable portion to prevent recognition of the optically readable pattern.

15 Claims, 3 Drawing Sheets

Fig.1.
Fig.2.
Fig.3.
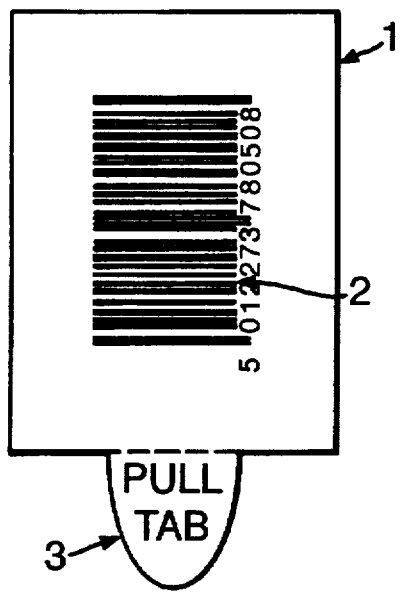
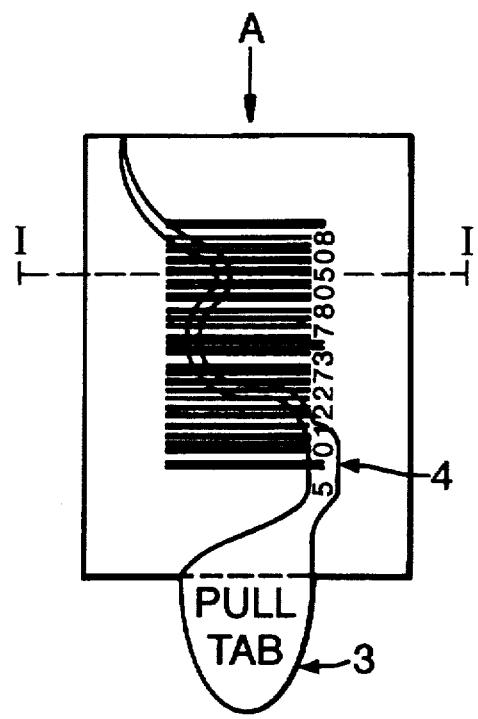
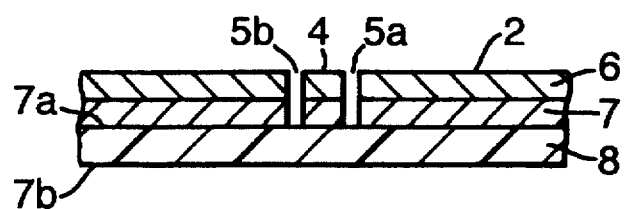

SECURITY LABEL

This invention relates to a new security system, in particular a security label having both tamper-evident and anti-counterfeit features.

Known tamper evident systems provided on articles rely heavily on the customer to both initially notice the position of the system on the article and subsequently recognise if the system has been interfered with. A recent study (reported by H. E. Lockhart, PIRA Symposium on Intelligent Packaging, December 1992) conducted on 1,500 people showed that only 19% of packages having a tampered-with security system were identified as such where the tampering to the article had been repaired.

Nearly all articles sold to the public now include a bar code on their outer surface. Such a bar code is an example of a machine readable pattern.

The bar code is typically provided in the form of a rectangle comprising a series of parallel bars of varying width, each bar corresponding to an electronically readable digit. Usually the arabic numeral corresponding to the electronic digit is printed at the base of the bar. The code represented by the combined sequence of bars serves to identify the article, and standard international bar codes have 13 bars (i.e. 13 digits). These are typically read at point-of-sale kiosks or as part of a stock room validation system by an infra-red laser reader.

As nearly all articles sold to the public include this feature the applicants have recognised that by providing a tamper-evident security label comprising the code there may be provided a two-fold check for tampering: firstly at point-of-sale or in a stock room by the laser reader; and secondly visually by the customer.

Accordingly one aspect of the present invention comprises a security label for an article having an outer layer with machine readable pattern printed on its upper surface; and a second layer adjacent the outer layer; characterized in that the label is provided with a pull tab extending from the outer and second layers, which pull tab is attached to a detachable portion of the outer and second layers extending across the length and/or width of the machine readable pattern on the security label.

Thus by pulling the pull tab across the length and/or width of the security label the machine readable pattern is disrupted, preventing reading of the code by an electronic reader. Furthermore, this tampering will also be immediately apparent to a customer by visual inspection of the security label.

The material comprising the outer layer of the security label may, for example, be a paper material or a polymeric material (e.g. polyester, polyvinyl chloride, or polyvinyl alcohol. In particular, the material comprising the upper surface of the outer layer of the security label should generally be suitable for high quality printing of the machine readable pattern thereon. Printing processes which may be used include flexographic, letter-press, lithographic, or laser printing.

Where the machine readable pattern is a bar code, the detachable portion of the label is generally in the form of a strip not more than one millimeter thicker than the widest bar of the bar code. The strip may be defined by die cutting, preferably performed before the bar code is printed on to the outer surface. Other means for defining the detachable portion may be employed, e.g. a laser cutter may be used.

Generally the outer layer is itself a self-adhesive label.

The second layer may itself be an adhesive to bond the outer layer to an article.

Alternatively the security label may further include an inner layer which is in contact with the second layer and may be attached to the article such as a package, to be protected, usually by means of an adhesive.

Such an inner layer generally comprises a plastics material, for example low density polyethylene (LDPE) or polypropylene, although it will be understood that other suitable materials may be used. There is either no adhesive coating between the inner layer and the second layer, or preferably a moderate peel strength adhesion (provided for example by using a silicone resin between the two layers), to aid removal of the detachable portion.

Preferably the detachable portion of the outer and second layers extends in a meandering path across the length of the security label. This feature offers the advantage that the resulting detached portion of the security label is extremely difficult to replace, as the meandering path means that the detached portion takes the form of a coil and is especially difficult to replace in the security label.

The outer layer may be bonded to the second layer using a permanent adhesive, for example Fasson S451, Taktik adhesive, Samuel Jones 523 or 3M Molecular adhesive (Trade Marks) and the second layer may be able to be mounted on an article using an adhesive of moderate peel strength adhesion.

Thus the bond of the second layer to the outer layer will be weaker than the bond of the inner layer to the eventual article to be marked.

The detachable portion may also include lugs extending along the region of the detachable portion closest to the remainder of the inner and outer layers. These lugs act as an additional obstacle to repositioning the detached portion once removed.

Preferably the surface of the inner layer in contact with the second layer has visually distinctive colour, most preferably red. The advantage of this is two-fold; on the one hand the colour red is particularly distinct when visually inspected, so that the customer will readily see that the product has been tampered with, whilst on the other hand red is not readable by an infra-red scanner.

The outer layer may optionally be provided with a laminate on top of the bar code which may obscure the bar code to the naked eye and/or a photocopier. This helps to prevent reproduction of the bar code (e.g. by a potential counterfeiter) by copying.

A second aspect of the invention provides a tamper-evident package comprising a rectangular box-shaped carton having a pair of opposing side walls and a pair of end openings adjacent to the side walls, wherein at least one of the side walls is formed by bonding an outer panel to an inner panel, the outer panel having an aperture thus exposing a region of the inner panel to visual inspection, and the bond between the inner and outer panels being such that a break in the bond surrounding the said exposed region will cause visual disruption in the exposed part of the inner panel; and wherein the carton has at at least one end a security label requiring destruction before said one end can be opened, said security label including a machine readable pattern related to a further machine readable pattern on said inner panel such that any disruption to any said further machine readable pattern will be evident by comparison of the first-mentioned and further patterns.

The invention will now be illustrated by way of non-limiting example, with reference to the accompanying drawings in which:

FIG. 1 shows a security label according to the invention;

FIG. 2 shows the security label of FIG. 1 with the line of travel of the detachable portion exposed;

FIG. 3 shows an enlarged cross-section along line I—I in FIG. 2 looking in the direction of the arrow A;

Figure 4:
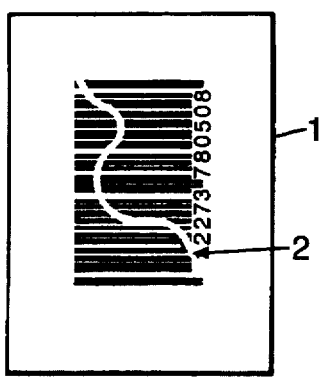
FIG. 4 shows the security label of FIG. 1 after removal of the pull tab and the detachable portion.

Referring to the drawings FIG. 1 shows a security label 1 suitable for use with an article, the label 1 having a bar code 2 printed on its upper surface. The label 1 has a pull tab 3 extending from it. In this example the bar code has 13 digits which define the European Article Number (E.A.N.), in which the information is divided into three parts:

the manufacturer's prefix (in this case 5012273);

the item reference number (in this case 780508); and a check digit (in this case 0).

The manufacturer's prefix is unique and allocated to the company manufacturing or marketing the product; the item reference number is allocated by the manufacturer to the product it wishes to identify; and the check digit is calculated by applying an algorithm to the digits and this same algorithm is used by the reading device (in this case an infra-red scanner) to ensure the information of the manufacturer's prefix and item reference number has been correctly read.

As shown in FIG. 2 the pull tab is attached to a detachable portion 4 of the security label which extends in a meandering path across the length and width of the security label 1.

Referring to FIG. 3 the security label 1 comprises an upper layer 6 upon which the bar code 2 is printed. The upper layer 6 is made from Fasson LW 60 light weight 60 g face paper. This is attached to a second layer 7 by a strong adhesive, in this case Fasson S451. The second layer comprises a paper material, which itself may comprise more than one layer. The detachable portion 4 is formed by die cutting through the outer layer 6 and second layer 7 to provide a strip in a channel between slits 5a and 5b (5a and 5b are exaggerated for the purpose of illustration). The second layer 7 is more weakly bonded to an inner layer 8. The bonded surface 8a of the inner layer is coated with a releasing agent such as a silicone resin so that the inner layer 8 itself comprises a silicone release paper (such as that known by the Trade Mark Glassine). In this case there is a weak adhesive bond between the second layer 7 and the inner layer 8 formed using an adhesive which allows peeling of the detachable portion 4 from the rest of the label.

To facilitate this peeling the adhesive bond between the second layer 7 and the inner layer 8, while being peelable, is preferably strong enough to hold the remainder other than the detachable portion 4 still attached to the inner layer 8 when the portion 4 is peeled away. If desired the adhesive strength under the detachable portion 4 may be locally stronger than elsewhere on the label to achieve this result.

The surface 8a of the inner layer 8 is red. The inner layer 8 is attached to the article and is provided with a self-adhesive coating on surface 8b for this purpose.

In use the user pulls the pull tab 3 away from the plane of the security label 1. The user continues to pull the tab which peels the detachable portion 4 away from the inner layer 8, exposing the red surface 8a of the inner layer 8 to visual inspection. Furthermore, as shown in FIG. 4 the effect of removing the detachable portion is to disrupt the bar code 2, preventing the infra-red reader from identifying the article.

The security tab is preferably made from a water soluble material such as poly vinyl alcohol. For the purpose of preferred material the device could be made from water-soluble paper i.e. "Dissolvo" (Trademark) paper. The paper would be printed using a non-soluble ink, typically a black pigmented ink suitable for litho or flexographic printing.

Another form of machine readable pattern which could be used instead of the bar code is a two-dimensional dot code which involves printing an array of dots on the surface of the label and viewing the label with a scanning head of any type capable of resolving the individual dots of the pattern and of providing an overall picture which can then be analysed to determine the pattern of the dots. Numerous different patterns of dots can be used, and each would correspond to a particular identification code. Digital analysis of an image in order to identify the particular pattern is something well within the scope of the expert in the art and does not need detailed explanation here. Equally such dot patterns are well known in the art and have for many years been used in forms such as the holes punched in a computer-readable punched card.

The scanning head may be software-driven and may use infra-red, Ultra-violet, or visible light radiation or may be magnetically responsive to the readable pattern. Other scanning systems for machine readable patters are possible.

Figure 5:
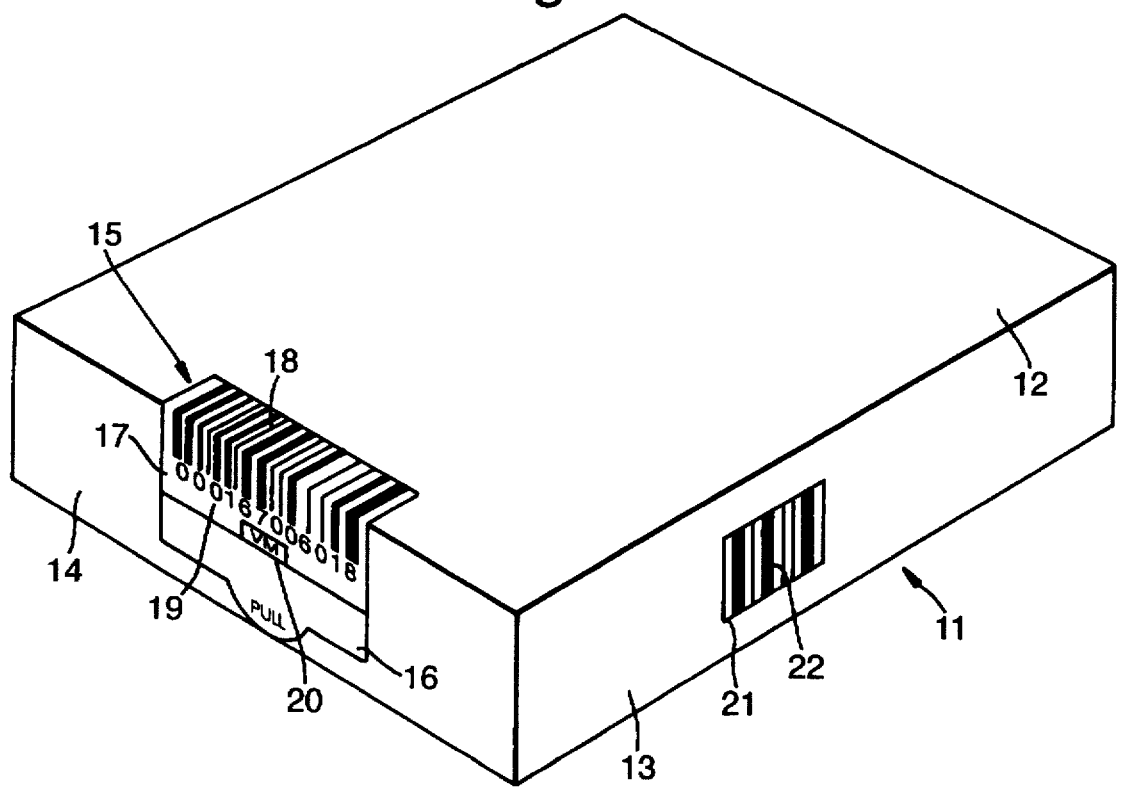
FIG. 5 shows a package bearing the label of the invention.

Having now described various alternatives for the security label or tab itself, there now follows a description of FIG. 5 showing a package 11 having a top wall 12, and two sidewalls 13, one of which is visible in FIG. 5.

On the end wall 24 of the pack closest to the observer is a security tab in accordance with the present invention. On this security tab generally referenced 15 there is a pull tab 16 joined to the main panel 17 on which is printed a bar code 18 representing the EAN which is in turn printed in arabic numerals at 19.

Additionally the security tab 15 includes the letters VM which are an instruction to the user or consumer to verify manually the integrity of the pack.

On the sidewall 13 is a window 21 of the outer panel of the wall 13; because the sidewall 13 is where the blank of the pack has been folded over to superimpose two panels to form the side join of the pack it is possible to see, through the window 21, the surface of an inner panel of the blank which would otherwise be concealed by the outer panel 13. This inner panel has printed on it a bar code 22. In this case the security tab 15 is formed of water soluble material as explained above.

FIG. 5 thus shows a package which has an exposed region 20 at bar code 22 where it will be clearly evident, by visual inspection, if the product has been tampered with at that point.

The label 15 with a bar code printed thereon also provides further tamper evident means. The bar code 18 on the label 15 may be used in conjunction with the bar code 22 provided in the region 20; for example the bar code reader may first read the data provided on the bar code 18. This bar code may instruct the reader to check the first bar code (at 22) and, if any discontinuities are found at the first bar code, for example due to tampering, the reader may indicate an error. This system is designed to be self-policing at a retail check out, or to be used before the packed product leaves the packing line.

The bar code on the security tab 15 will preferably contain product identification information, but more importantly it will contain instructions to seek and to read a pharma-code contained on the flap 14 of the carton. If at this stage the carton has not been opened or tampered with, the first bar code 22 will be complete and readable. The scanning device will therefore complete the loop of the validation process and validate the carton. If, for any reason, any of the points of entry have been broken, or if the continuous bar codes have become broken or distorted due to fibre tear, it will either be visible to the naked eye, or will be visible by the infra-red scanning device.

It is not essential for the label 15 to be formed of water-soluble "Dissolvo" (Trade Mark) paper. It could for example be formed of poly vinyl alcohol (PVOH) fibres or of thicker paper, or indeed of any other material.

The water-soluble paper or tissue material is preferred since the introduction of liquid chemicals in tampering would cause all or part of the substrate to dissolve, rendering the bar code printing unsupported and thus unreadable. It is within the scope of the invention to print either or both bar codes in different inks, some of which will be resistant to solvents, and some of which will be soluble in solvents. This is desirable in order to prevent the use of solvents and other preparations to remove the security bar code altogether for replacement with a counterfeit version.

The water soluble label 15, printed complete with bar code 18, is fixed in the same way as, and to serve the same purpose as, a conventional tamper evident seal.

In normal use the security bar coded label is designed to be removed as follows:

The label 15 has an integral pull tab 16 preferably over a varnished area of the carton end flap 14, the substrate on the pull tab having a low tack peelable adhesive. This has the effect of not only facilitating release, but accelerating the process of aggressive fibre tear when the rest of the label is treated with permanent adhesive. The combination of permanent adhesive and weak fibrous water soluble material causes considerable visual distortion to the bar code lines, which is plainly visible to the naked eye. Trying to lift the label with liquid water or solvent will have a similar effect.

In the normal scanning of bar codes, whilst it is a rare occurrence, it is nevertheless possible to obtain a non-readable bar code. This can be caused by a number of reasons, such as poor print, damage to the code, or simply faulty scanning equipment. In these circumstances the operator at the check out will be obliged to key in the bar code manually using a digital identification number (shown as 19 in FIG. 5) corresponding to the E.A.N. number encoded in the bar code 18. Since the system depends on accurate bar code reading, such a situation raises the question whether there is a genuine fault or whether the bar code reader is scanning a label that has been tampered with. In such an event there is a visual system to reject the carton or to enable the code to be simply keyed in to authenticate the package. This is achieved by the specially designed panel 20 (FIG. 5), directly alongside the bar code 18 and digital number 19, that shows a small rectangle printed on the label and containing the letters "VM" (Validate Manually) in red. The rear surface of this panel of the label 15 will have been spot glued to the carton end flap 8 with a "3M" (Trademark) molecular adhesive. If the carton has been violated beyond this point by attempts to peel off the label 13, the letters "VM" will have been destroyed by aggressive fibre tear. The centre part of the bar code will also be very badly damaged and this will be visually very evident to the person who has purchased the item, but more importantly to the trained operator at the check out.

Figure 6:
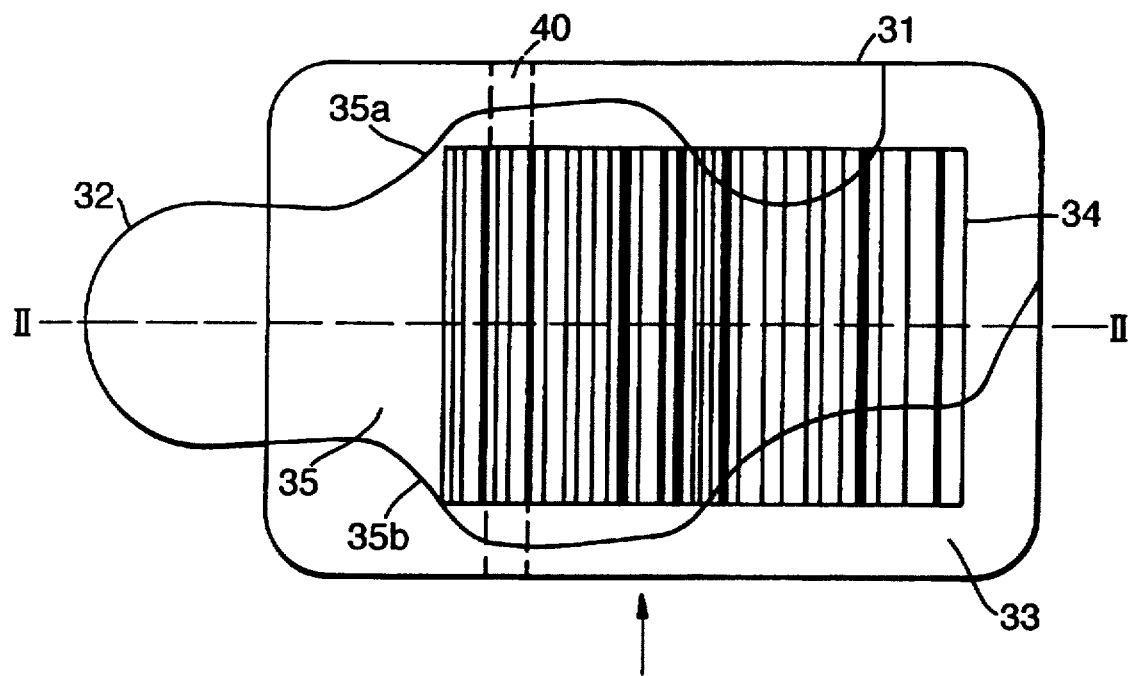
FIG. 6 shows a further security label according to the invention.
Figure 7:
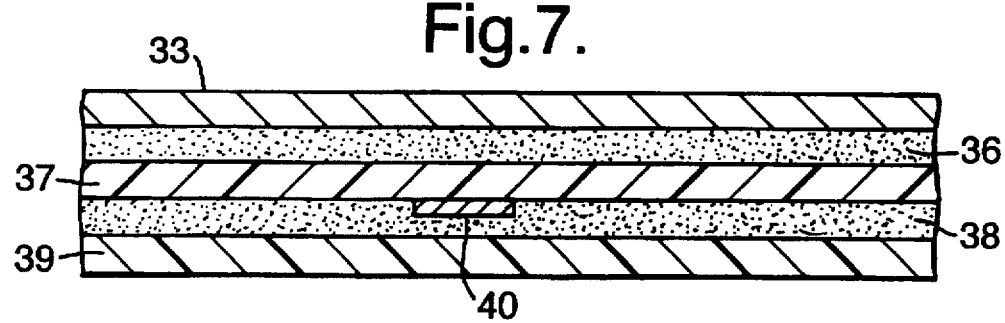
FIG. 7 shows an enlarged partial cross-section along line II—II in FIG. 7 looking in the direction of the arrow B.

Referring to FIGS. 6 and 7, the security label 31 comprises a pull tab 32 extending from an outer layer 33, which outer layer bears a bar code pattern 34 on its outer surface. The dashed lines 35a and 35b define the meandering path of a detachable portion 35 of the outer layer 33. The outer layer 33 is attached by means of a peelable adhesive layer 36 to an inner layer 37. The inner layer 37 carries an adhesive layer 38 on its inner surface, which will in use be attached to a package. In this configuration the security label 31 has not yet been attached to the package and is provided with a removable backing layer 39, in this case comprising a silicone material. The security label 31 also includes a validation member 40 in the form of a thin metal foil strip extending across the width of the security label (see dashed line in FIG. 6) and which is embedded in the adhesive layer 38. This validation member 40 is thus hidden from view before the detachable portion 35 of the label is removed, but once the portion 35 is removed the validation member 40 becomes visible through the inner layer 37. A label which lacks this validation member 40 can be assumed to be an illicit copy, suggesting that tampering has occurred. For avoiding counterfeiting of the security label it is instead possible to incorporate any other form of validation member, such as a microdot, in an adhesive layer.

I claim:

1. A security label for an article, having an outer layer (6) with a machine readable pattern (2) printed on its upper surface; and a second peelable adhesive layer (7) adjacent the outer layer; wherein the label is provided with a detachable portion (4) of the outer layer extending in a meandering path across the length and/or width of the machine readable pattern on the security label; the label further including an inner layer (8) in contact with the second layer (7) and able to be attached to an article.

2. A security label according to claim 1 characterized in that the label is provided with a pull tab (3) extending from the outer layer (6) and the second layer (7) and in that the pull tab is attached to the detachable portion (4) of the outer layer.

3. A security label according to claim 1, characterized in that the material of the outer layer (6) is a paper material or a polymeric material.

4. A security label according to claim 3, characterized in that the polymeric material is one of polyester, polyvinylchloride or polyvinyl alcohol.

5. A security label according to claim 1, characterized in that the inner layer (8) is attached to the article to be protected by means of an adhesive.

6. A security label according to claim 5 characterized by further including a validation member, incorporated in the security label.

7. A security label according to claim 6, characterized in that the validation member is embedded in said adhesive used for attaching the label to an article to be protected.

8. A security label according to claim 1, characterized in that said inner layer (8) in a plastic material, preferably low-density polyethylene or polypropylene.

9. A security label according to claim 1, characterized in that the surface of the inner lay (8) in contact with the second layer (7) has a visually distinctive colour, preferably red.

10. A security label according to claim 1, characterized that in that the machine readable pattern is a bar code and in that, in the meandering path of the detachable portion its width is no more than 1 mm greater than the width of the widest bar of the bar code.

11. A security label according to claim 1 characterized in that said machine readable pattern comprises a two-dimensional dot pattern.

12. A security label according to claim 1, characterized by including a laminate obscuring the machine readable pattern (2) on the outer layer (6).

13. A package characterized in that it comprises a carton having at one end a security label to indicate whether the package has been illicitly opened, said security label having an outer layer (6) with a machine readable pattern (2) printed on its upper surface; and a second peelable adhesive layer (7) adjacent the outer layer; wherein the label is provided with a detachable portion (4) of the outer layer extending in a meandering path across the length and/or width of the machine readable pattern on the security label; the label further including an inner layer (8) in contact with the second layer (7) and able to be attached to the carton, the carton further having a window along a sidewall at which the carton is sealed by bonding superposed panels to one another, said window being formed in the outer of said superposed panels and exposing a machine readable pattern on the inner of said panels; and that the machine readable patterns of said inner panel and said security label represent the same code number.

14. A security label according to claim 6, wherein said validation member is a metal foil strip.

15. A security label according to claim 1, wherein a low peel strength adhesion is provided by a silicon resin between said second and inner layers.

* * * * *

UNITED STATES PATENT AND TRADEMARK OFFICE
CERTIFICATE OF CORRECTION

PATENT NO. : 5,895,075
DATED : April 20, 1999
INVENTOR(S) : David Brian Edwards

It is certified that error appears in the above-indentified patent and that said Letters Patent is hereby corrected as shown below:

Column 4, line 28, "24" should be --14--.

Column 6, line 50, Claim 8, "in" should be --is--.

Column 6, line 53, Claim 9, "lay" should be --layer--.

Signed and Sealed this

Ninth Day of November, 1999

Attest:

Q. TODD DICKINSON

*Attesting Officer*          *Acting Commissioner of Patents and Trademarks*